US009266568B2

(12) United States Patent
Nishino et al.

(10) Patent No.: US 9,266,568 B2
(45) Date of Patent: Feb. 23, 2016

(54) VEHICLE BODY LOWER SECTION STRUCTURE

(71) Applicant: TOYOTA JIDOSHA KABUSHIKI KAISHA, Toyota-shi, Aichi-ken (JP)

(72) Inventors: Akira Nishino, Aichi-gun (JP); Gen Nishida, Toyota (JP); Hideyuki Takahashi, Nisshin (JP); Satoshi Kasai, Nisshin (JP); Daisuke Noguchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/547,645

(22) Filed: Nov. 19, 2014

(65) Prior Publication Data
US 2015/0145283 A1 May 28, 2015

(30) Foreign Application Priority Data

Nov. 25, 2013 (JP) .................. 2013-243339

(51) Int. Cl.
*B62D 25/20* (2006.01)
*B62D 25/02* (2006.01)
*B62D 25/14* (2006.01)

(52) U.S. Cl.
CPC .......... *B62D 25/2045* (2013.01); *B62D 25/025* (2013.01); *B62D 25/14* (2013.01); *B62D 25/145* (2013.01)

(58) Field of Classification Search
CPC .......... B62D 25/2018; B62D 25/2045; B62D 25/145; B62D 25/025

USPC ............ 296/187.08, 187.12, 193.02, 193.05, 296/193.06, 193.07, 203.03, 30, 70, 209
See application file for complete search history.

(56) References Cited

U.S. PATENT DOCUMENTS

| 5,562,329 | A  | * | 10/1996 | Srock et al. ............ 296/203.01 |
|---|---|---|---|---|
| 7,832,795 | B2 | * | 11/2010 | Yokoi et al. ................ 296/204 |
| 2002/0195840 | A1 | * | 12/2002 | Mishima et al. ......... 296/203.01 |
| 2005/0140179 | A1 | * | 6/2005 | Morsch et al. ............... 296/204 |
| 2011/0156446 | A1 | * | 6/2011 | Iwase et al. ............. 296/193.06 |
| 2012/0043785 | A1 | * | 2/2012 | Mildner .................. 296/193.02 |

FOREIGN PATENT DOCUMENTS

| JP | S63-168166 | U | 11/1988 |
|---|---|---|---|
| JP | 2003-261068 | A | 9/2003 |
| JP | 2005-193843 | A | 7/2005 |
| JP | 2009286181 | A | 12/2009 |
| JP | 2012-115876 | A | 6/2012 |

OTHER PUBLICATIONS

Aug. 25, 2015 Office Action issued in related Japanese Patent Application No. 2013-243339 with partial English translation.

* cited by examiner

*Primary Examiner* — Jason S Morrow
(74) *Attorney, Agent, or Firm* — Oliff PLC

(57) ABSTRACT

A vehicle body lower section structure has a rocker that extends in a vehicle body front-rear direction at an outside in a vehicle width direction of a floor panel; and a dashboard cross member that extends in the vehicle width direction at a lower side of a dashboard panel, and an outside end portion of the dashboard cross member in the vehicle width direction is superimposed on and connected to an upper face of the rocker.

8 Claims, 6 Drawing Sheets

VEHICLE BODY LOWER SECTION STRUCTURE

CROSS-REFERENCE TO RELATED APPLICATION

This application claims priority under 35 USC 119 from Japanese Patent Application No. 2013-243339 filed Nov. 25, 2013, the disclosure of which is incorporated by reference herein.

BACKGROUND OF THE INVENTION

1. Technical Field

The present invention relates to a vehicle body lower section structure.

2. Related Art

As described in Japanese Patent Application Laid-Open (JP-A) No. 2005-193843, for example, a conventional vehicle body lower section structure is proposed in which a rocker extending in a vehicle body front-rear direction, and a dashboard cross member extending in the vehicle width direction at a higher position than the rocker, are coupled together by a gusset.

SUMMARY

However, when the dashboard cross member is disposed at a higher position than the rocker, durability is not high with respect to a bending moment that bends the rocker upward in the event of a small overlap collision or an offset collision of the vehicle. There is therefore room for improvement in a structure increasing durability with respect to the bending moment that bends the rocker upward.

An object of the present invention, therefore, is to obtain a vehicle body lower section structure that can increase durability with respect to the bending moment that bends a rocker upward.

In order to realize the above object, a vehicle body lower section structure of a first aspect of the present invention includes a rocker that extends in a vehicle body front-rear direction at an outside in a vehicle width direction of a floor panel, and a dashboard cross member that extends in the vehicle width direction at a lower side of a dashboard panel, and an outside end portion thereof in the vehicle width direction is superimposed on and connected to an upper face of the rocker.

According to the first aspect, the outside end portion in the vehicle width direction of the dashboard cross member that extends in the vehicle width direction is superimposed on and connected to the upper face of the rocker. Accordingly, in the event of a small overlap collision or an offset collision of the vehicle, a bending moment that is input through the front wheel and bends the rocker upward is thereby restrained by the outside end portion of the dashboard cross member. Durability with respect to the bending moment that bends the rocker upward is thereby increased.

A vehicle body lower section structure of a second aspect of the present invention is the vehicle body lower section structure of the first aspect, in which the outside end portion of the dashboard cross member is superimposed on and connected to an inside face of the rocker.

According to the second aspect, the outside end portion of the dashboard cross member is superimposed on and connected to the inside face of the rocker. In the event of a small overlap collision or an offset collision of the vehicle, a bending moment that is input through the front wheel and bends the rocker inward is thereby restrained by the outside end portion of the dashboard cross member. Durability with respect to the bending moment that bends the rocker inward is thereby increased.

A vehicle body lower section structure of a third aspect of the present invention is the vehicle body lower section structure of the first aspect or the second aspect, in which the outside end portion of the dashboard cross member is connected to a lower side of a front pillar.

According to the third aspect, the outside end portion of the dashboard cross member is connected to the lower side of the front pillar. In the event of a small overlap collision or an offset collision of the vehicle, collision load input through the front wheel to the front pillar is transmitted to the dashboard cross member. The collision load input to the front pillar is thereby efficiently dispersed.

A vehicle body lower section structure of a fourth aspect of the present invention is the vehicle body lower section structure of any one of the first aspect to the third aspect, in which the outside end portion of the dashboard cross member is disposed in a position overlapping in a vehicle body up-down direction with a rear end portion of a front wheel as viewed along the vehicle width direction.

According to the fourth aspect, the outside end portion of the dashboard cross member is disposed in a position overlapping in the vehicle body up-down direction with the rear end portion of a front wheel as viewed along the vehicle width direction. Accordingly, in the event of a small overlap collision or an offset collision of the vehicle, the collision load input to the front wheel is thereby efficiently transmitted through the front wheel to the dashboard cross member.

A vehicle body lower section structure of a fifth aspect of the present invention is the vehicle body lower section structure of any one of the first aspect to the fourth aspect, in which the dashboard cross member includes a first cross member that extends in the vehicle width direction and has a hat shaped cross-section protruding toward an upper side, a second cross member that extends in the vehicle width direction at a vehicle body front side of the first cross member and has a hat shaped cross-section protruding toward an upper side, and a coupling member that integrally couples together a substantially center portion in the vehicle width direction of the first cross member and a substantially center portion in the vehicle width direction of the second cross member in the vehicle front-rear direction, and that has a hat shaped cross-section protruding toward an upper side.

According to the fifth aspect, the dashboard cross member includes the first cross member and the second cross member, each extending in the vehicle width direction and formed with the hat shaped cross-section protruding toward the upper side, and the coupling member that integrally couples together the first cross member and the second cross member in the vehicle front-rear direction, and is formed with the hat shaped cross-section protruding toward the upper side. Accordingly, in the event of a small overlap collision or an offset collision of the vehicle, the collision load input through the front wheel is efficiently dispersed through the first cross member, the second cross member, and the coupling member.

A vehicle body lower section structure of a sixth aspect of the present invention is the vehicle body lower section structure of the fifth aspect, in which the first cross member, the second cross member, and the coupling member are integrated together by contiguously providing a flange portion at a front side in the vehicle body front-rear direction of the first cross member, a flange portion at a rear side in the vehicle body front-rear direction of the second cross member, and flange portions at both left and right sides in the vehicle width direction of the coupling member.

According to the sixth aspect, the first cross member, the second cross member, and the coupling member are integrated together by their respective flange portions. The strength (rigidity) of the first cross member, the second cross member, and the coupling member is therefore enhanced, and the number of components in the dashboard cross member can be reduced.

A vehicle body lower section structure of a seventh aspect of the present invention is the vehicle body lower section structure of any one of the second aspect to the sixth aspect, in which the outside end portion of the dashboard cross member is provided with a first flange portion formed bending so as to be superimposed on the upper face and the inside face of the rocker, and a second flange portion formed bending so as to extend upward from an outer end portion of the first flange portion and an outer end portion of the second cross member.

According to the seventh aspect, the outside end portion of the dashboard cross member is provided with the first flange portion formed bending so as to be superimposed on the upper face and the inside face of the rocker, and the second flange portion formed bending so as to extend upward from the outer end portion of first flange portion and the outer end portion of the second cross member. Accordingly, in the event of a small overlap collision or an offset collision of the vehicle, even if a bending moment (stress) to bend a front end portion of the rocker upward and inward is generated due to collision load input through the front wheel, the bending moment is efficiently restrained by the outside end portion of the dashboard cross member, namely, the first and second flange portions. The durability (strength and rigidity) of the front end portion of the rocker with respect to the bending moment is thereby increased by the dashboard cross member.

A vehicle body lower section structure of an eighth aspect of the present invention is the vehicle body lower section structure of any one of the fifth aspect to the seventh aspect, in which a flange portion at a rear side in the vehicle body front-rear direction of the first cross member is provided at a rear end portion of the dashboard cross member, and an outside end portion in the vehicle width direction of the rear side flange portion is disposed in a position at substantially the same height as a lower face of the rocker.

According to the eighth aspect, the flange portion at rear side in the vehicle body front-rear direction of the first cross member is provided at the rear end portion of the dashboard cross member, and the outside end portion in the vehicle width direction of the rear side flange portion is disposed in a position at substantially the same height as the lower face of the rocker. The front end portion of the rocker from the upper face to the lower face can thereby be efficiently restrained by the dashboard cross member from the vehicle body upper side and the vehicle width direction inside. In the event of a small overlap collision or an offset collision of the vehicle, bending deformation toward the vehicle body upper side and the vehicle width direction inside (upper folding and inner folding) occurring in the front end portion of the rocker can thereby be still more efficiently suppressed or prevented.

As explained above, according to the first aspect, durability of the vehicle body lower section structure with respect to a bending moment bending the rocker upward can be increased.

According to the second aspect, durability of the vehicle body lower section structure with respect to the bending moment bending the rocker inward can be increased.

According to the third aspect, collision load input to the front pillar can be efficiently dispersed.

According to the fourth aspect, collision load input to the front wheel can be efficiently transmitted through the front wheel to the dashboard cross member.

According to the fifth aspect and the sixth aspect, collision load input through the front wheel can be efficiently dispersed through the dashboard cross member.

According to the seventh aspect and the eighth aspect, durability of the vehicle body lower section structure with respect to a bending moment bending the rocker upward and inward can be further increased.

BRIEF DESCRIPTION OF THE DRAWINGS

Embodiments of the present invention will be described in detail based on the following figures, wherein.

DETAILED DESCRIPTION OF THE INVENTION

Detailed explanation follows regarding an exemplary embodiment of the present invention, based on the drawings. Note that for ease of explanation, in each of the drawings, the arrow UP indicates the vehicle body upward direction, the arrow FR indicates the vehicle body front direction, the arrow LE indicates the vehicle body left direction, and the arrow RI indicates the vehicle body right direction, as appropriate. Moreover, reference in the below explanation to the front-rear, up-down and left-right directions without specific explanation refers to the front-rear of the vehicle body front-rear direction, the up-down of the vehicle body up-down direction, and the left-right of the vehicle body left-right direction (vehicle width direction).

Furthermore, in the below explanation, "inside face" refers to a face facing toward an inside in the vehicle width direction, and "outside face" refers to a face facing toward an outside in the vehicle width direction. Moreover, FIG. 2 to FIG. 6 illustrate the left side of a vehicle body, and since the right side of the vehicle body is the same but with left-right symmetry, explanation regarding the right side of the vehicle body is omitted as appropriate.

Figure 5:
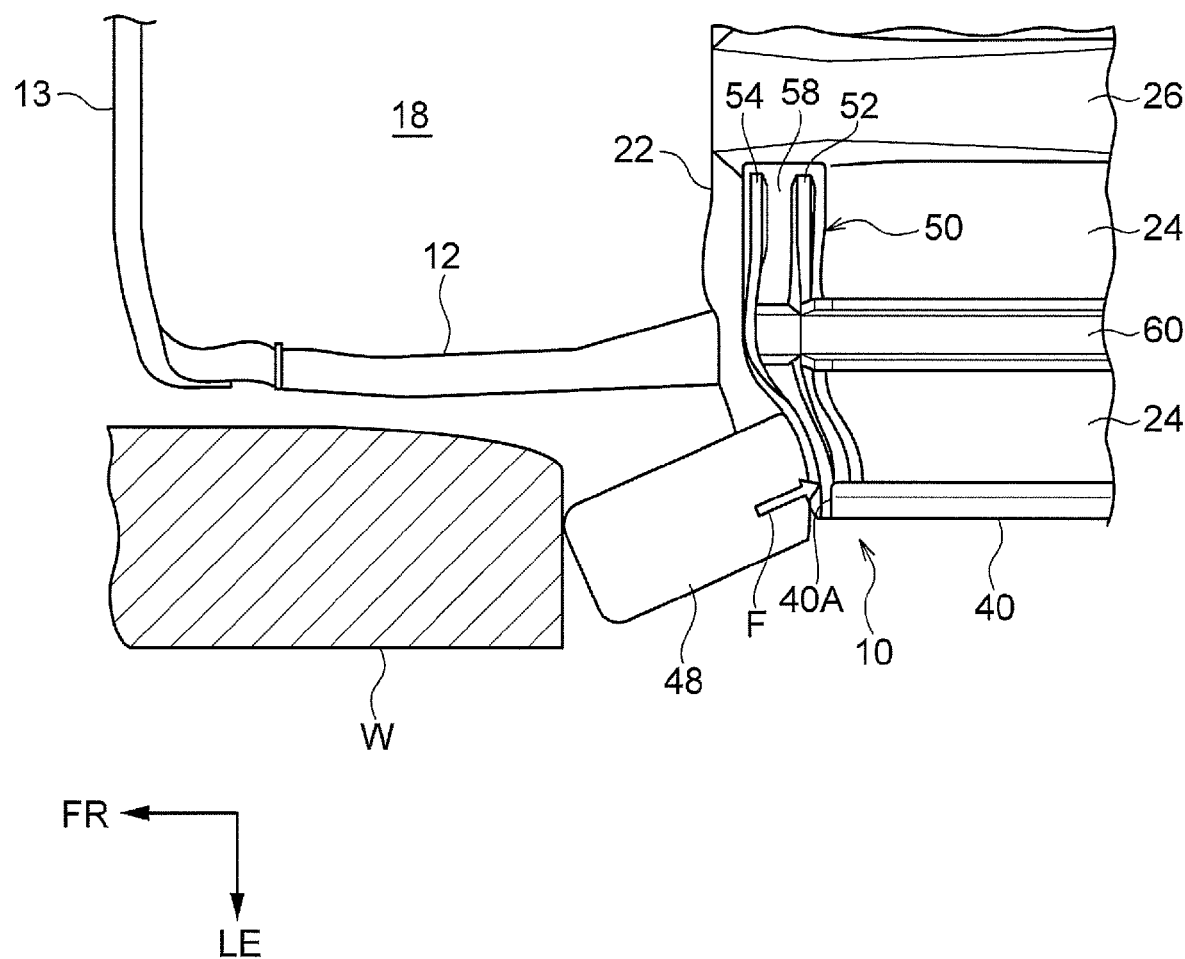
FIG. 5 is a plan view illustrating a state of a vehicle provided with a vehicle body lower section structure according to an exemplary embodiment when involved in a small overlap collision.
Figure 6:
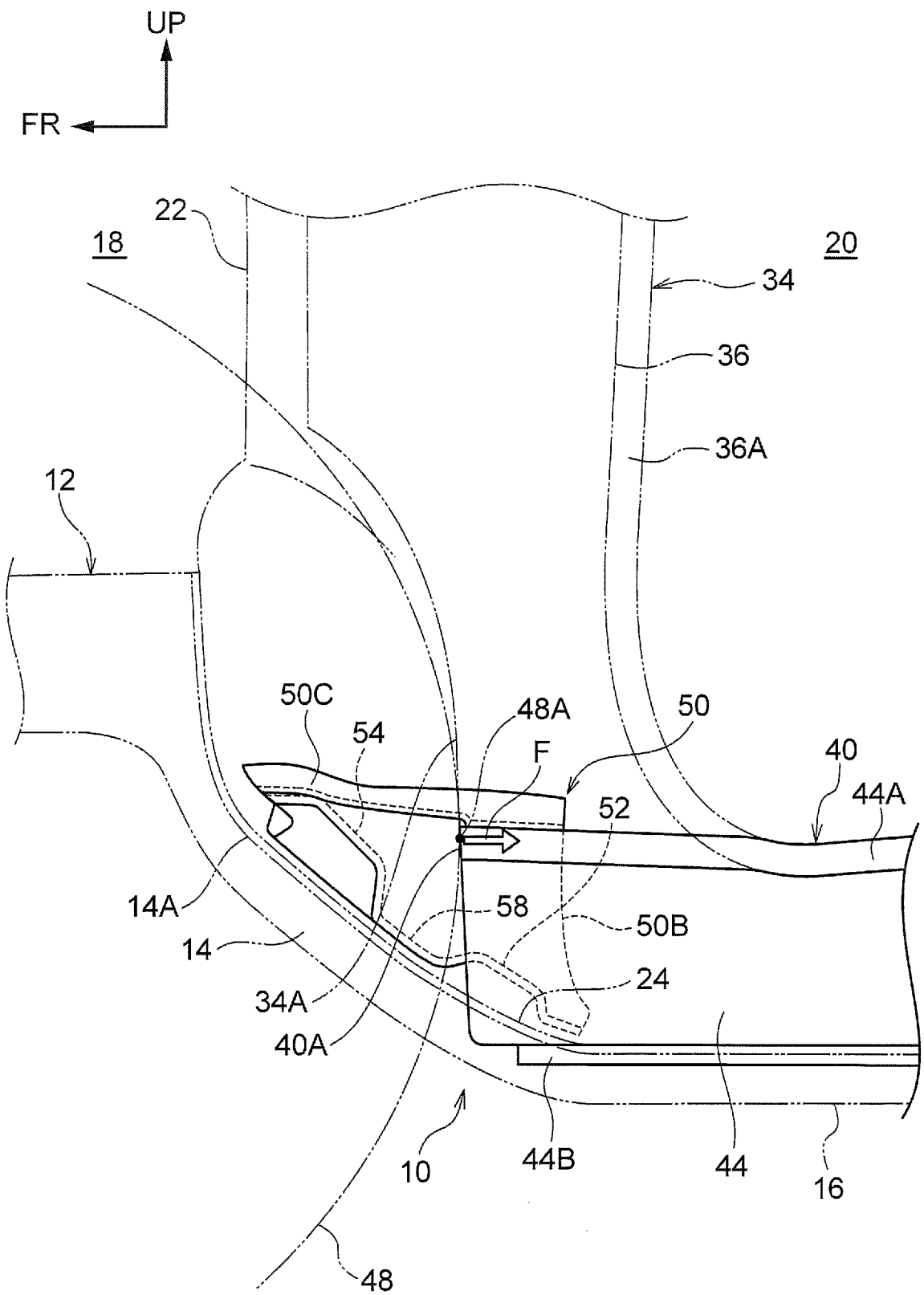
FIG. 6 is an enlarged side view illustrating a state of a vehicle provided with a vehicle body lower section structure according to an exemplary embodiment when involved in a small overlap collision.

As illustrated in FIG. 5 and FIG. 6, a left and right pair of front side members 12 are disposed at a vehicle body front section upper side of a vehicle. Each of the front side members 12 has rectangular closed cross-section shape, extends along the vehicle body front-rear direction, and configures vehicle body frame members. A front bumper reinforcement 13, that has rectangular closed cross-section shape and extends in the vehicle width direction, is disposed spanning between front end portions of the respective front side members 12.

A rear portion of the front side member 12 inclines toward the vehicle body rear lower side, and a kick portion 14, that is formed with a hat shaped cross-section and protrudes toward the lower side, is contiguously provided integrally to the rear portion of the front side member 12. The kick portion 14 straddles across a back face (front face) of a dashboard panel 22 partitioning between an engine compartment room 18 and a vehicle cabin 20, and a back face (lower face) of a floor panel 24 configuring a vehicle body floor. Left and right flange portions 14A of the kick portion 14 are joined (welded) to the respective back faces of the dashboard panel 22 and the floor panel 24, thereby configuring a closed cross-section structure.

Positions at which the dashboard panel 22 and the floor panels 24 are contiguously provided may be at a front side, or may be at a rear side, of dashboard lower cross members 50, described later. Namely, the dashboard lower cross member 50 may be joined straddling the dashboard panel 22 and the floor panel 24, or may be joined only to the dashboard panel 22, or joined only to the floor panel 24.

Figure 1:
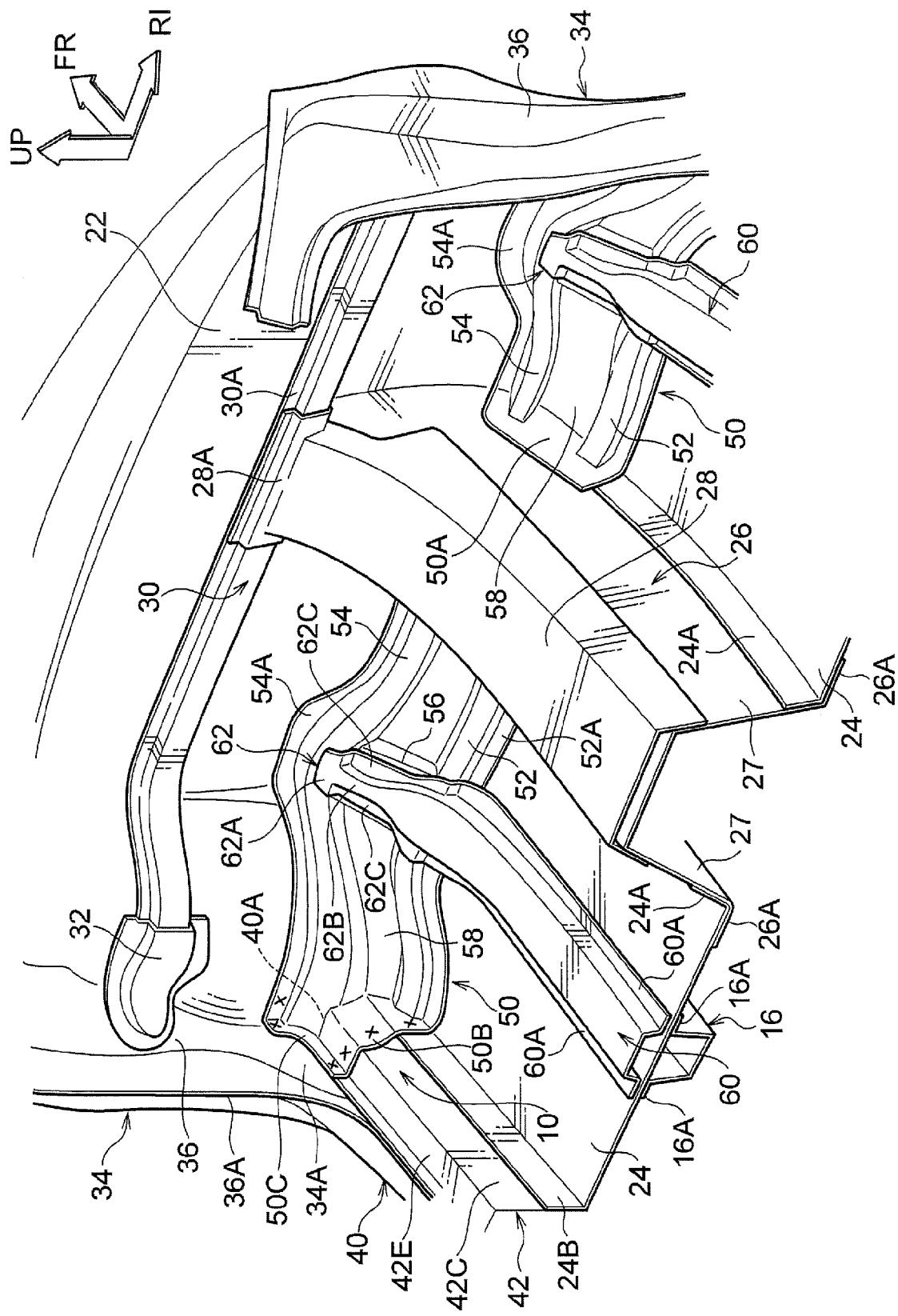
FIG. 1 is a perspective view illustrating a vehicle body lower section structure according to an exemplary embodiment.

As illustrated in FIG. 1 and FIG. 6, a rear portion of the kick portion 14 extends toward the vehicle rear side, and an under reinforcement 16 that is formed in hat shaped cross-section protruding toward the lower side is contiguously provided integrally to the rear portion of the kick portion 14. Left and right flange portions 16A of the under reinforcement 16 are joined (welded) to the back face (lower face) of the floor panel 24 that is contiguously provided integrally from the dashboard panel 22 toward the vehicle body rear side, thereby configuring a closed cross-section structure.

A floor tunnel section 26, extending in the vehicle body front-rear direction and configuring a vehicle body frame member, is provided at a center lower section in the vehicle width direction of the vehicle. The floor tunnel section 26 is formed in a hat shaped cross-sections protruding toward the upper side, and left and right flange portions 26A are joined (welded) to back faces (lower faces) of inside end portions in the vehicle width direction of the respective floor panels 24.

The inside end portions of the floor panels 24 each configures a flange portion 24A formed bending upward, and each of the flange portions 24A is joined (welded) to respective left and right side walls 27 of the floor tunnel section 26. A front end portion of the floor tunnel section 26 is integrally joined to a center lower portion in the vehicle width direction of the surface (rear face) of the dashboard panel 22.

An upper portion of the floor tunnel section 26 is further provided with a panel member 28, that has substantially inverted "U" shaped cross-section and is formed with a shift lever insertion hole, or the like, not illustrated in the drawings. A front end portion 28A of the panel member 28 is joined to a dashboard upper cross member 30 by nuts and bolts, for example (not illustrated in the drawings).

The dashboard upper cross member 30 extends across substantially the entire vehicle width direction, and is formed in a hat shaped cross-section protruding toward the rear side. Upper and lower flange portions of the dashboard upper cross member 30 are each joined (welded) to an upper portion of the surface (rear face) of the dashboard panel 22, thereby configuring a closed cross-section structure.

Both left and right end edge portions of the dashboard panel 22 are joined to respective inner panels 36 of left and right front pillars 34, that extends in the vehicle body up-down direction at outside in the vehicle width direction. Both end portions 32 in the vehicle width direction of the dashboard upper cross member 30 are respectively joined to the left and right end edge portions of the dashboard panel 22, and to the inner panels 36 of the left and right front pillars 34, by nuts and bolts (not illustrated in the drawings).

Figure 2:
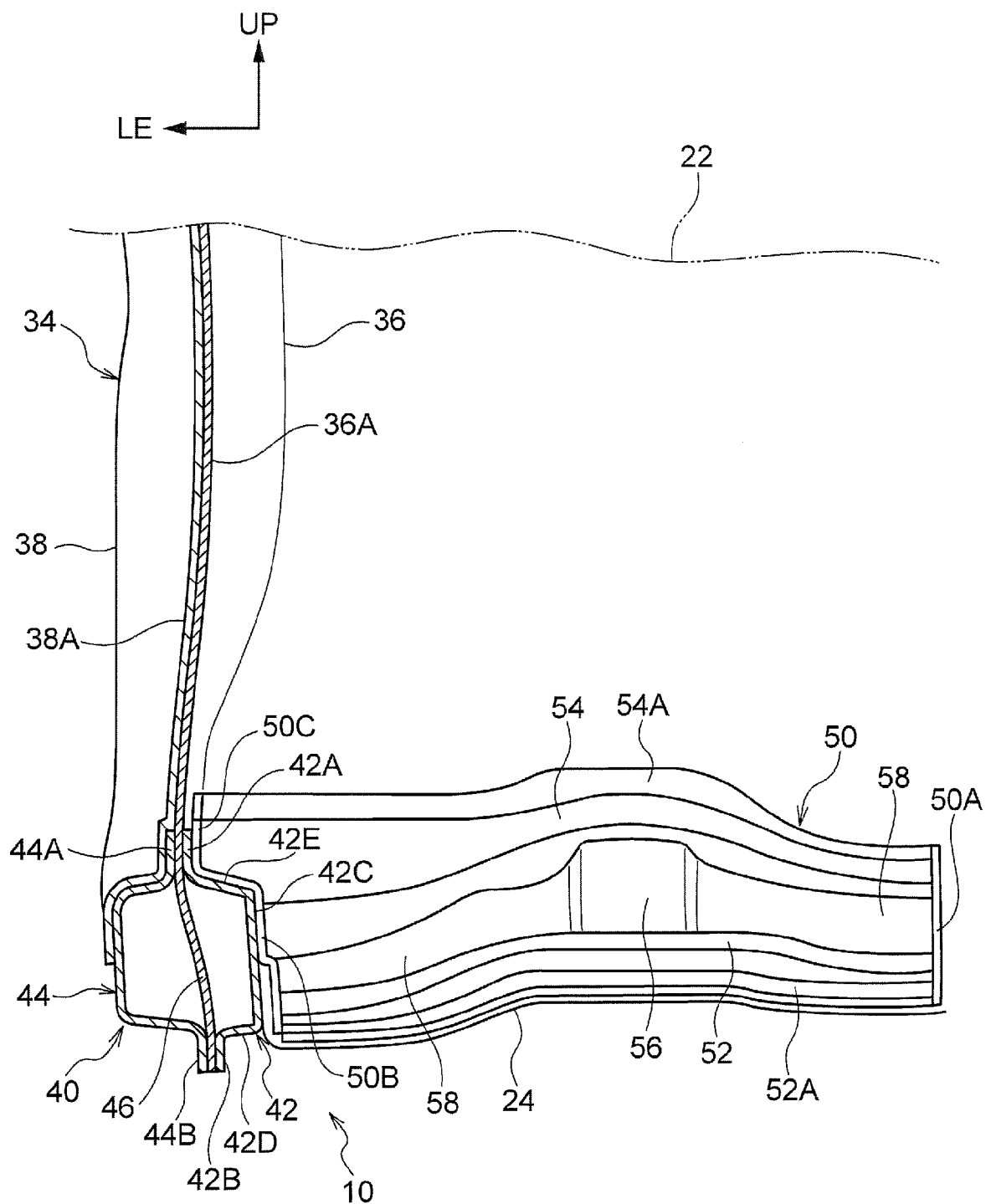
FIG. 2 is a back face view illustrating a partial cross-section of a vehicle body lower section structure according to an exemplary embodiment.

As illustrated in FIG. 2, the inner panel 36 is formed in hat shaped cross-sections protruding toward the inside and an outer panel 38 is formed in hat shaped cross-sections protruding toward the outside, and front and rear flange portions 36A of the inner panel 36 and front and rear flange portions 38A of outer panel 38 are mutually joined (welded) together such that the front pillar 34 configures closed cross-section structure.

As illustrated in FIG. 1 to FIG. 4, rockers 40, extending in the vehicle body front-rear direction and configuring vehicle body frame members, are provided to vehicle width direction outside lower sections of the vehicle. The rockers 40 each includes an inner panel 42 that has a hat shaped cross-section protruding toward the inside, an outer panel 44 that has a hat shaped cross-section protruding toward the outside, and a substantially flat plate shaped rocker reinforcement 46 provided between the inner panel 42 and the outer panel 44.

An upper flange portion 42A and a lower flange portion 42B of the inner panel 42, and an upper flange portion 44A and a lower flange portion 44B of the outer panel 44 are respectively joined (welded) to an inside face and an outside face of the rocker reinforcement 46, that is integrated to the front and rear flange portions 36A of the inner panel 36, thereby configuring the rocker 40 with a closed cross-section structure.

As illustrated in FIG. 1, outside end portions in the vehicle width direction of the respective floor panels 24 configure flange portions 24B formed bending upward, and the flange portions 24B are joined (welded) to the respective inner panels 42 of the rockers 40. Namely, the rockers 40 extend in the vehicle body front-rear direction at outside in the vehicle width direction of the floor panels 24.

As illustrated in FIG. 1 to FIG. 4 and FIG. 6, a left and right pair of the dashboard lower cross members 50, serving as dashboard cross members, are provided extending in the vehicle width direction. The dashboard lower cross members 50 are interposed between the dashboard panel 22 and the floor panels 24 so as to be disposed on the surface (rear face) at the lower side of the dashboard panel 22 and on the surface (upper face) at the front side of the floor panels 24. The dashboard lower cross members 50 are provided on the opposite side to the kick portions 14 side of the dashboard panel 22 and the floor panels 24.

The dashboard lower cross member 50, configuring a vehicle body lower section structure 10, couples together the floor tunnel section 26 and the rocker 40 in the vehicle width direction, and inside end portion in the vehicle width direction of the dashboard lower cross member 50 configures a flange portion 50A formed bending upward. The flange portion 50A is joined by spot welding so as to straddle between the flange portion 24A of the floor panel 24 and the side wall 27 of the floor tunnel section 26 (or is joined to the side wall 27 only).

The dashboard lower cross members 50 each includes a first cross member 52 and a second cross member 54. The first cross member 52 extends in the vehicle width direction at the surface (upper face) side of the floor panel 24 and has a hat shaped cross-section protruding toward the upper side. The second cross member 54 extends in the vehicle width direction at the surface (rear face) side of the dashboard panel 22 at the vehicle body front side of the first cross member 52, and has a hat shaped cross-section protruding toward the upper side.

The dashboard lower cross members 50 each also includes a coupling member 56 that extends in the vehicle body front-rear direction and integrally couples together the first cross member 52 and he second cross member 54 in the vehicle body front-rear direction, and that has a hat shaped cross-section protruding toward the upper side. The coupling member 56 couples a substantially center portion in the vehicle width direction of the first cross member 52 and a substantially center portion in the vehicle width direction of the second cross member 54. The center portions of the first cross member 52 and the second cross member 54 are positioned between the left and right flange portions of the kick portion 14 in plan view.

Furthermore, a front side flange portion of the first cross member 52, a rear side flange portion of the second cross member 54, and both left and right side flange portions of the coupling members 56 of the dashboard lower cross member 50 are contiguously provided integrally to each other, such that the first cross member 52, the second cross member 54 and the coupling member 56 configure an integral unit.

Note that the dashboard lower cross member 50 may be configured such that the front side flange portion of the first cross member 52, the rear side flange portion of the second cross member 54, and both left and right side flange portions of the coupling member 56 are not contiguously provided integrally to each other.

However, when the flange portions described above are contiguously provided integrally to each other (the contiguously provided integral location is hereafter referred to as a "contiguous portion 58"), and the first cross member 52, the second cross member 54 and the coupling member 56 configure an integral unit, the strength (rigidity) thereof is enhanced, and the number of components in the dashboard lower cross member 50 is reduced.

Figure 4:
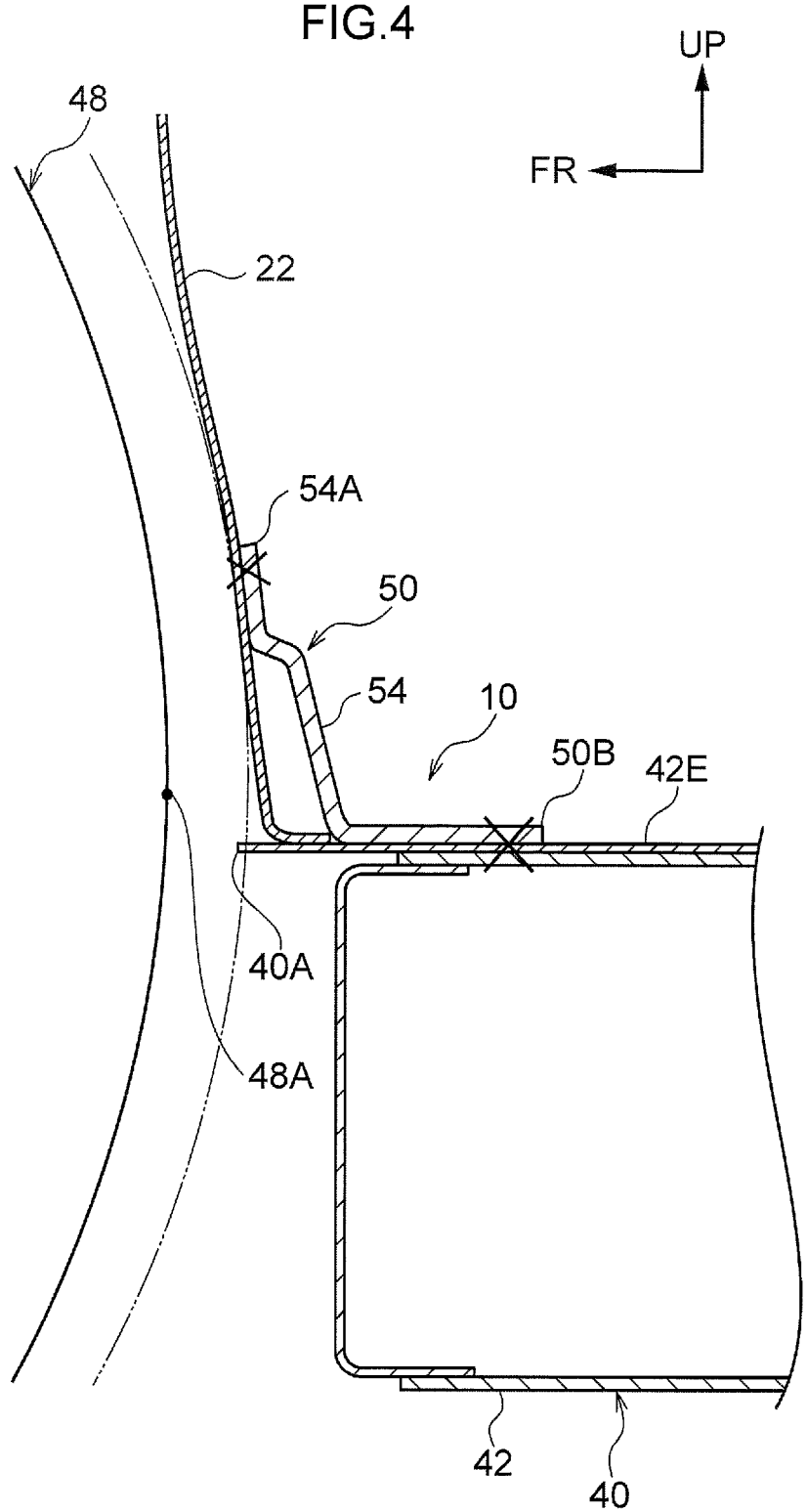
FIG. 4 is an enlarged side view illustrating a joint portion of a dashboard lower cross member to a rocker and a dashboard panel of a vehicle body lower section structure according to an exemplary embodiment.

A rear side flange portion 52A of the first cross member 52 is joined by spot welding to the surface (upper face) of the floor panel 24. As illustrated in FIG. 4, a front side flange portion 54A of the second cross member 54 is joined by spot welding to the surface (rear face) of the dashboard panel 22 (the spot weld portions are indicated by "x").

The dashboard lower cross member 50 (the first cross member 52, the second cross member 54, and the coupling member 56) thereby configures a closed cross-section structure with the dashboard panel 22 and the floor panel 24, and the closed cross-section structure is easily configured. Namely, ease of assembly of the dashboard lower cross members 50 to the vehicle body is improved.

Note that, as described above, the dashboard lower cross member 50 may configure a closed cross-section structure with only the dashboard panel 22, or may configure a closed cross-section structure with only the floor panel 24, depending on what location the dashboard panel 22 and the floor panel 24 are contiguously provided.

The rear side flange portion 52A of the first cross member 52 and the front side flange portion 54A of the second cross member 54 are also spot welded to the flange portion 14A of the kick portion 14 with the floor panel 24 interposed therebetween. The contiguous portion 58 at both left and right sides of the coupling member 56 between the first cross member 52 and the second cross member 54 is also spot welded to the flange portion 14A of the kick portion 14 with the floor panel 24 interposed therebetween.

In other words, the coupling member 56 is provided between the left and right spot weld portions, such that the coupling member 56 is disposed in a position superimposed on the kick portion 14 (front side member 12) in plan view and in back face view. Namely, the coupling member 56 is disposed at the upper side of the kick portion 14 (front side member 12), running along the extension direction of the kick portion 14 (front side member 12).

As illustrated in FIG. 1 to FIG. 4, an outside end portion in the vehicle width direction of the dashboard lower cross member 50 is configured by a flange portion 50B formed bent so as to wrap round a front end portion 40A side of the rocker 40, namely, so as to trace the shape of the inner panel 42 of the rocker 40, and a flange portion 50C formed bent so as to extend upward from respective outer end portions of the flange portion 50B, the second cross member 54, and the flange portion 54A.

As illustrated in FIG. 2, an outside end portion in the vehicle width direction of the flange portion 52A of the dashboard lower cross member 50 excluding the flange portion 50B is disposed at a position at substantially the same height as a lower face 42D of the rocker 40 (inner panel 42), and an outside end portion in the vehicle width direction of the flange portion 54A of the dashboard lower cross member 50 excluding the flange portion 50C is disposed at a position at substantially the same height as the upper flange portion 42A of the rocker 40 (inner panel 42)

Namely, an outside end portion in the vehicle width direction of the dashboard lower cross member 50 (the first cross member 52, the contiguous portion 58 and the second cross member 54) is disposed at a position at substantially the same height as the rocker 40. The flange portions 50B, 50C configuring the outside end portion in the vehicle width direction of the dashboard lower cross member 50 are joined by spot welding so as to couple the front end portion 40A of the rocker 40 to a lower end portion (lower side) 34A of the front pillar 34.

Figure 3:
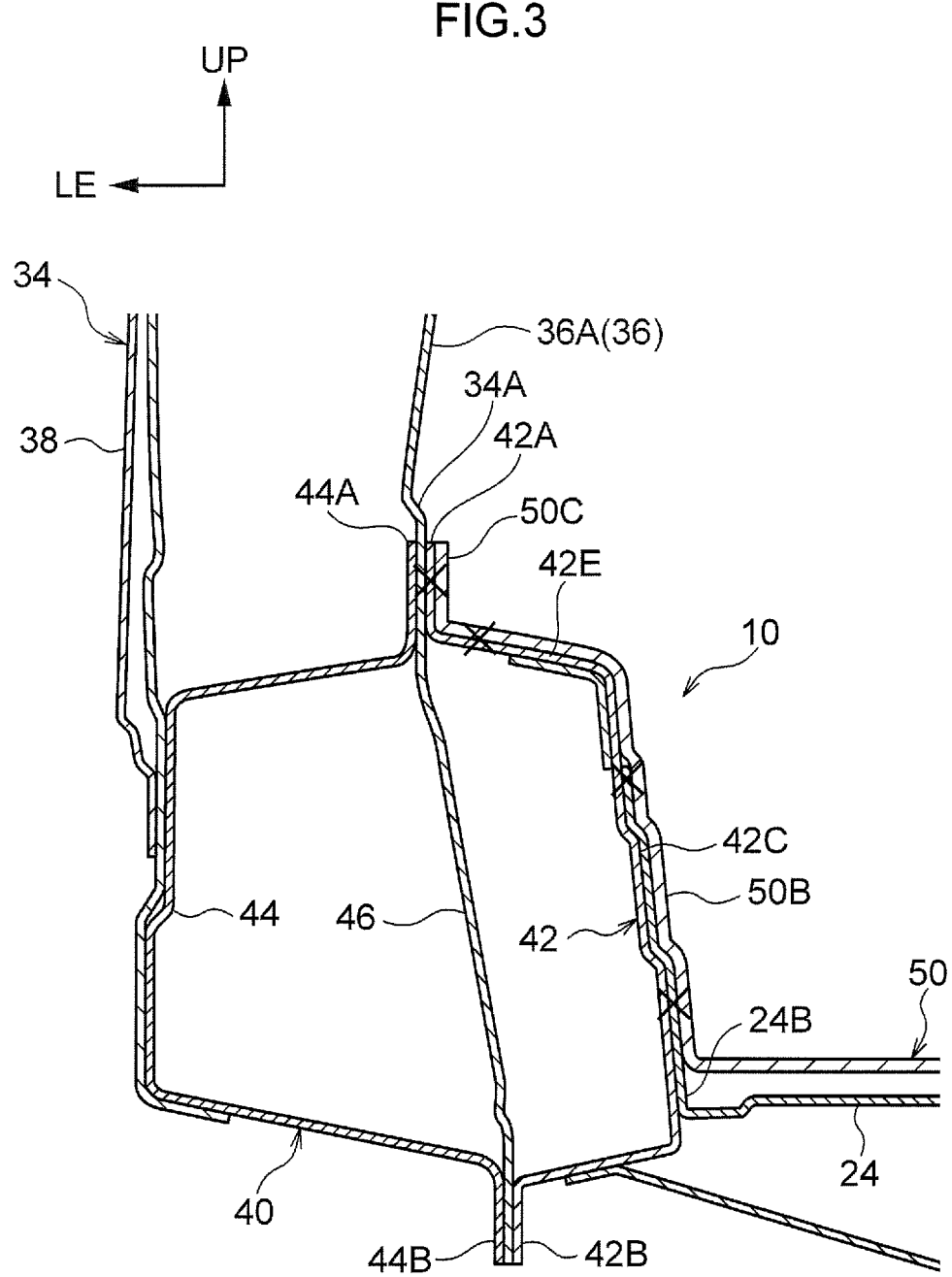
FIG. 3 is an enlarged cross-section view illustrating a joint portion of a dashboard lower cross member to a rocker of a vehicle body lower section structure according to an exemplary embodiment.

To explain in detail, as illustrated in FIG. 1 and FIG. 3, the flange portion 50B formed at the outside end portion in the vehicle width direction of the first cross member 52 including the rear side flange portion 52A and the contiguous portion 58 is superimposed on an inside face 42C, an inside face of the flange portion 24B of the floor panel 24, and an upper face 42E of the inner panel 42 at the front end portion 40A side of the rocker 40, and is joined thereto by spot welding (the spot weld portions are indicated by "x").

Moreover, the flange portion 50C contiguously provided integrally to the outside end portion in the vehicle width direction of the second cross member 54, the flange portion 54A, and an outer end portion of the flange portion 50B are superimposed so as to abut an inside face of the upper flange portion 42A of the inner panel 42 at the front end portion 40A side of the rocker 40, and an inside face of the inner panel 36 at the lower end portion 34A of the front pillar 34, and are joined thereto by spot welding (the spot weld portions are indicated by "x").

As illustrated in FIG. 4, in side face view (viewed along the vehicle width direction), the outside end portion in the vehicle width direction of the second cross member 54 of the dashboard lower cross member 50, configuring a closed cross-section structure with the dashboard panel 22, is disposed at an upper portion side of the front end portion 40A of the rocker 40 so as to overlap a position at substantially the same height in the vehicle body up-down direction with a rear end portion 48A of a front wheel 48. The rear end portion 48A is a location positioned furthest to the rear side in plan view and in side face view of front wheel 48.

As a result, in cases in which the front wheel 48 moves backward due to a small overlap collision or an offset collision, for example, and the rear end portion 48A side thereof collides with the lower end portion 34A of the front pillar 34 and the front end portion 40A of the rocker 40, backward movement of the front wheel 48 is restrained by the second cross member 54 of the dashboard lower cross member 50, and collision load input as a result is efficiently transmitted and dispersed to the floor tunnel section 26 through the second cross member 54.

Moreover, even if a bending moment (stress), which bends the front end portion 40A of the rocker 40 upward and inward, is generated by the collision load, the bending moment is efficiently restrained by the outside end portion in the vehicle width direction of the dashboard lower cross member 50, namely, by the flange portions 50B, 50C. The durability (strength and rigidity) of the front end portion 40A of the rocker 40 with respect to the bending moment is thereby increased by the dashboard lower cross member 50.

As illustrated in FIG. 1, upper reinforcements 60, that have hat shaped cross-sections protruding toward the upper side, are disposed extending in the vehicle body front-rear direction at the surface (upper face) of the floor panels 24 at the opposite side to the kick portions 14 and the under reinforcements 16, such that the floor panels 24 are interposed therebetween.

Each of the upper reinforcements 60, serving as a floor reinforcement, configures a closed cross-section structure, due to left and right flange portions 60A that are respectively joined by spot welding to the surface (upper face) of the floor panel 24. A front end portion 62 of the upper reinforcement 60 is joined to the dashboard lower cross member 50 by spot welding, thereby configuring a closed cross-section structure.

To explain in detail, the front end portion 62 of the upper reinforcement 60 is formed substantially "T" shaped in plan view, and a leading end portion 62A thereof extending in the vehicle width direction is joined to an upper wall of the second cross member 54 by spot welding. Projecting portions 62C projecting to the left and right from a lower side of a narrow width portion 62B formed to a rear side of the leading end portion 62A are joined to an upper wall of the coupling member 56 by spot welding.

The front end portion 62 of the upper reinforcement 60 is thereby configured so as to cover the entire coupling member 56 from above, and the coupling member 56 configures a portion of the upper reinforcement 60. Note that, although some of the spot weld portions of the dashboard lower cross member 50 are indicated by "x" in FIG. 1, FIG. 3, and FIG. 4, the spot welding portions are not limited to the illustrated positions.

Explanation follows regarding operation of the vehicle body lower section structure 10 with the above configuration.

As illustrated in FIG. 5 and FIG. 6, in cases of a small overlap collision or an offset collision of the vehicle with a barrier W, the front wheel 48 moves toward the vehicle body rear side due to the barrier W, and the rear end portion 48A side thereof collides with the lower end portion 34A of the front pillar 34 and the front end portion 40A of the rocker 40. Namely, a collision load F is input to the lower end portion 34A of the front pillar 34 and the front end portion 40A of the rocker 40 through the front wheel 48.

A portion of the collision load F input to the lower end portion 34A of the front pillar 34 is transmitted to the front pillar 34, and is transmitted by the second cross member 54 of the dashboard lower cross member 50 to the floor tunnel section 26. Note that a portion of the collision load F is also transmitted from the second cross member 54, through the coupling member 56 to the first cross member 52, and transmitted by the first cross member 52 to the floor tunnel section 26.

A portion of the collision load F input to the front end portion 40A of the rocker 40 is transmitted to the rocker 40, and is transmitted from the front end portion 40A of the rocker 40, by the first cross member 52 of the dashboard lower cross member 50, to the floor tunnel section 26. Note that a portion of the collision load F is also transmitted through the first cross member 52 to the upper reinforcement 60.

In this way, the collision load F transmitted (input) from the lower end portion 34A of the front pillar 34, and from the front end portion 40A of the rocker 40 to the dashboard lower cross member 50 is efficiently dispersed in the floor tunnel section 26 and the upper reinforcement 60. In the event of a small overlap collision or an offset collision, the load share of the front pillar 34 and the rocker 40 can thereby be reduced, and a bending moment (upper folding and inner folding, described later) generated in the front end portion 40A of the rocker 40 can be reduced.

Moreover, the flange portion 50B configuring the outside end portion in the vehicle width direction of the dashboard lower cross member 50 is joined so as to wrap round the front end portion 40A of the rocker 40. Namely, the flange portion 50B is superimposed on the inside face 42C and the upper face 42E of the inner panel 42 of the rocker 40, and is joined thereto by spot welding.

Moreover, the flange portion 50C configuring the outside end portion in the vehicle width direction of the dashboard lower cross member 50 is superimposed on the inside face of the upper flange portion 42A of the inner panel 42, and the inside face of the inner panel 36 of the lower end portion 34A of the front pillar 34, and is joined thereto by spot welding.

In a case in which the dashboard lower cross member 50 is connected to the rocker 40 through a gusset, for example, there would be a possibility that a joint portion with the gusset would be a weak portion in the event of a small overlap collision or an offset collision. However, since in the present exemplary embodiment as described above, the flange portions 50B, 50C of the dashboard lower cross member 50 are directly joined to the front end portion 40A of the rocker 40, there is no portion present that forms a weak portion.

The front end portion 40A of the rocker 40 can therefore be efficiently restrained by the flange portions 50B, 50C of the dashboard lower cross member 50 from the upper side of the vehicle body and the inside in the vehicle width direction. Bending deformation toward the vehicle body upper side and the vehicle width direction inside (upper folding and inner folding) which may be caused in the front end portion 40A of the rocker 40 in the event of a small overlap collision or an offset collision can thereby be suppressed or prevented. Namely, deformation of the vehicle cabin 20 due to upper folding and inner folding of the front end portion 40A of the rocker 40 can be suppressed or prevented.

Although not illustrated in the drawings, collision load is input to the front side member 12 in the event of an offset collision of the vehicle. The collision load input to the front side member 12 is transmitted to the under reinforcement 16 through the kick portion 14, and also transmitted to the dashboard lower cross member 50. The load share of the kick portion 14 and the under reinforcement 16 is thereby reduced.

The collision load transmitted (input) to the dashboard lower cross member 50 is further transmitted by the second cross member 54 to the front pillar 34 and the floor tunnel section 26, and also transmitted by the coupling member 56 to the first cross member 52, and transmitted from the first cross member 52 to the rocker 40 and the floor tunnel section 26.

The collision load transmitted (input) to the dashboard lower cross member 50 is also transmitted from the coupling member 56 to the upper reinforcement 60. Thus the collision load transmitted (input) from the front side member 12 to the dashboard lower cross member 50 is efficiently dispersed to the floor tunnel section 26, the front pillar 34, the rocker 40, and the upper reinforcement 60.

Moreover, the front end portion 62 of the upper reinforcement 60 is joined to the dashboard lower cross member 50 so as to cover the coupling member 56 from above. A bending moment toward the vehicle body upper side, which is caused by backward movement of the kick portion 14 toward the vehicle body rear side, is applied to the dashboard lower cross member 50 through the dashboard panel 22 and the floor panel 24 with a lower end portion of the kick portion 14 as a pivot point. Such a bending moment can be restrained (reduced) by the upper reinforcement 60.

In other word, bearing of bending load (cross-sectional load bearing) of the kick portion 14 in the event of an offset collision or a full overlap collision can thereby be enhanced by the upper reinforcement 60. Accordingly, bending (lifting up) deformation of the front side member 12 toward the vehicle body upper side with the lower end portion of the kick portion 14 as the pivot point can thereby be suppressed or prevented, and deformation of the vehicle cabin 20 due to backward movement of the front side member 12 and the kick portion 14 can be suppressed or prevented.

Moreover, since, due to the dashboard lower cross member 50, a portion of the collision load input to the lower end portion 34A of the front pillar 34 and the front end portion 40A of the rocker 40 can be borne by the floor tunnel section 26, localized deformation of the front pillar 34 and the rocker 40 can be suppressed. This enables the load bearing of vehicle body frame members such as the front pillars 34 and the rockers 40 to be lowered by reducing the plate thickness of those members, for example, enabling weight reduction and cost reduction of the vehicle to be realized.

Explanation has been given above regarding the vehicle body lower section structure 10 according to the present exemplary embodiment based on the drawings, however there is no limitation of the vehicle body lower section structure 10 according to the present exemplary embodiment to the configurations illustrated in the drawings, and the design may be varied as appropriate within a range not departing from the scope of the present invention. For example, the vehicle body front-rear direction length of the flange portions 50B is not limited to that illustrated in the drawings, and the length may be configured as appropriate to enable efficient suppression of upper folding and inner folding of the front end portions 40A of the rockers 40.

Moreover, although the dashboard panel 22 and the respective floor panels 24 are configured as separate bodies that are contiguously provided integrally to each other, configuration is not limited thereto, and both members may be configured as an integral unit. For example, the dashboard panel 22 may be configured as an extension portion formed so as to rise up from front end portions of the floor panels 24 so as to be a portion of the floor panels 24. The dashboard lower cross members 50 may be configured joined to the extension portion, or may be configured joined to vertical walls (not illustrated in the drawings) serving as separate members provided so as to rise up from front end portions of the floor panels 24.

In the vehicle body lower section structure 10 according to the present exemplary embodiment, although each of the flange portions 50B, 50C of the dashboard lower cross members 50 are joined by spot welding to the inside faces 42C and the upper faces 42E of the rockers 40 (inner panel 42) and the lower end portions 34A of the front pillars 34, the joining means is not limited thereto. For example, a configuration may be applied in which joining is performed by laser welding to join in spot shapes, by gradually reducing a weld radius using a laser (see JP-A No. 2012-115876).

What is claimed is:

1. A vehicle body lower section structure comprising:
   a rocker that extends in a vehicle body front-rear direction at an outside in a vehicle width direction of a floor panel; and
   a dashboard cross member that extends in the vehicle width direction at a lower side of a dashboard panel, the dashboard cross member having an outside end portion in the vehicle width direction superimposed on and connected to an upper face of the rocker, the dashboard cross member including;
   a first cross member that extends in the vehicle width direction, first cross member having a hat shaped cross-section protruding toward an upper side of the first cross member; and
   a second cross member that extends in the vehicle width direction at a vehicle body front side from the first cross member, the second cross member having a hat shaped cross-section protruding toward an upper side of the second cross member.

2. The vehicle body lower section structure of claim 1, wherein the outside end portion of the dashboard cross member is superimposed on and connected to an inside face of the rocker.

3. The vehicle body lower section structure of claim 1, wherein the outside end portion of the dashboard cross member is connected to a lower side of a front pillar.

4. The vehicle body lower section structure of claim 1, wherein the outside end portion of the dashboard cross member is disposed in a position overlapping, in a vehicle body up-down direction, with a rear end portion of a front wheel, as viewed along the vehicle width direction.

5. The vehicle body lower section structure of claim 1, wherein the dashboard cross member includes:
   a coupling member that integrally couples together: (i) a substantially center portion in the vehicle width direction of the first cross member, and (ii) a substantially center portion in the vehicle width direction of the second cross member in the vehicle front-rear direction, the coupling member having a hat shaped cross-section protruding toward an upper side.

6. The vehicle body lower section structure of claim 5, wherein the first cross member, the second cross member, and the coupling member are integrated together by contiguously providing: (i) a flange portion at a front side in the vehicle body front-rear direction of the first cross member, (ii) a flange portion at a rear side in the vehicle body front-rear direction of the second cross member, and (iii) a plurality of flange portions at both a left side and a right side in the vehicle width direction of the coupling member.

7. The vehicle body lower section structure of claim 1, wherein the outside end portion of the dashboard cross member is provided with a first flange portion that bends so as to be superimposed on the upper face of the rocker and the inside face of the rocker, and a second flange portion that bends so as to extend upward from an outer end portion of the first flange portion and an outer end portion of the second cross member.

8. The vehicle body lower section structure of claim 5, wherein
   a flange portion at a rear side in the vehicle body front-rear direction of the first cross member is provided at a rear end portion of the dashboard cross member, and an outside end portion in the vehicle width direction of the rear side flange portion is disposed in a position at substantially a same height as a lower face of the rocker.

* * * * *